No. 786,855. PATENTED APR. 11, 1905.
E. TATUM.
FRUIT GATHERING DEVICE.
APPLICATION FILED AUG. 19, 1904.

WITNESSES:
D. E. Carlsen
E. C. Carlsen

INVENTOR.
Elwood Tatum.
BY his ATTORNEY.
A. M. Carlsen.

No. 786,855.  
Patented April 11, 1905.

UNITED STATES PATENT OFFICE.

ELWOOD TATUM, OF WESTBRANCH, IOWA.

FRUIT-GATHERING DEVICE.

SPECIFICATION forming part of Letters Patent No. 786,855, dated April 11, 1905.

Application filed August 19, 1904. Serial No. 221,360.

*To all whom it may concern:*

Be it known that I, ELWOOD TATUM, a citizen of the United States, residing at Westbranch, in the county of Cedar and State of Iowa, have invented certain new and useful Improvements in Fruit-Gathering Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to devices for clipping and gathering fruits and berries from trees, and is especially adapted and intended for clipping, gathering, and measuring cherries, as they are so easily bruised and pinched that picking them by hand is very damaging to them.

The principal object of the invention is to provide a very efficient, handy, and durable device for clipping, gathering, and measuring cherries and other berries and small fruits. This and other objects I attain by the novel construction and combination of parts illustrated in the accompanying drawings, in which—

Figure 1:
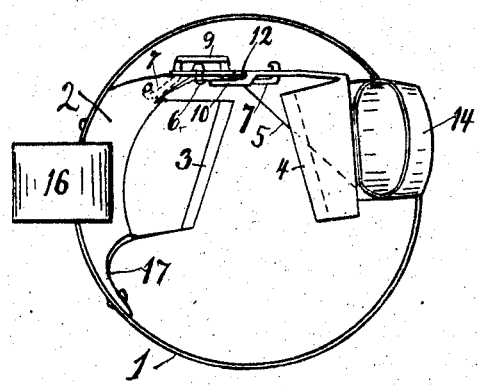
Figure 3:
Figure 2:
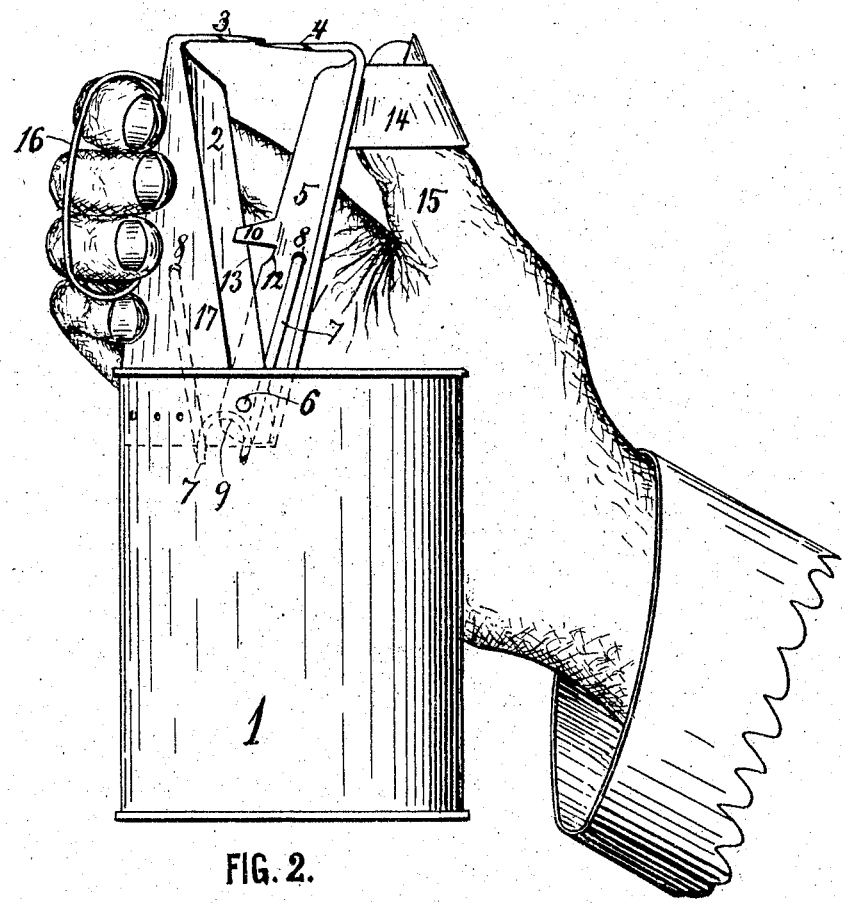

Figure 1 is a top view of my cherry clipping and gathering device. Fig. 2 is a front elevation of Fig. 1, fixed in operative position upon the hand holding and operating it and with the clipping-jaws partly closed, while in Fig. 1 they are about fully spread. Fig. 3 is a perspective view of the spring holding the clipping-jaws normally spread.

Referring to the drawings by reference-numerals, 1 designates the receptacle into which the cherries are gathered. This vessel is made of stiff material, like tin, galvanized iron, aluminium, or wood, so as to always maintain its size and form and be easy to keep clean. It is of a certain size, like one-half pint, one pint, or one quart, so that when it is full its contents may be emptied into the regular boxes used for the sale of such fruits or berries in the market.

To one side of the upper end of the vessel 1 I secure an upstanding arm 2, having at its upper end a horizontally-disposed clipping-jaw 3, with which coacts a similar jaw 4, provided at the upper end of an upstanding arm 5, which is pivoted at 6 to the fixed arm 2 and is normally held with the jaws spread apart, as in Fig. 1, by a two-armed spring 7, having its ends engaged in holes 8 in the two arms and its middle portion 9 bent over upon the arms at the side opposite from where the spring is, so as to hold the spring in position. The jaws and arms 2 and 5 are preferably made of sheet-steel, and the arm 2 is segmental in cross-section to make it stiff. In order to give steadiness to the arms and insure accurate action of the jaws, the arm 5 is pivoted upon one side of the jaw and has a guide 10, sliding upon the other side thereof. This also causes the bottom of the notch 12 below the guide to stop against the edge 13 of the fixed arm when the jaws or cutters are fully closed.

Upon the outer side of the arm 5 is secured a strap or keeper 14, adapted to go upon the thumb of the operator's right hand, and upon the fixed arm 2 is provided a larger strap or keeper 16, adapted to go upon several of the fingers of the same hand, which thus hold and operate the device, while the other hand is free to hold the twig or branch operated on. From this it will be understood that the device is operated by closing and spreading the jaws by the action of the thumb and fingers of the hand supporting the device, about as in Fig. 2; but such operating is easier on the thumb when the spring 7 is used to spread the arms and their clipping-jaws. An operator having a large hand may put only some of the fingers into the keeper 16, while one with a small hand may insert all the fingers in the keeper. One finger left outside the keeper will be found a great safeguard against slipping the device accidentally from the hand.

Integral with or adjacent to the arm 2 is provided a shield 17, which helps to guide the berries into and out of the receptacle and to keep them in the vessel until it is properly filled.

The jaws stand normally so far apart that the cherries and their stems will readily enter in between the jaws from either front or rear ends of same, so that they may be easily reached at either side of a twig or branch without turning the hand or the clipper, and as the jaws are elevated above both the vessel and the hand they are not obstructed by the hand, like in some crude devices which have been experimented with prior to my invention.

In addition to the advantages of this device already above mentioned it may be further stated that with this device the stems of the cherries are severed so easily and in proper place that a lot of long stems need not be sold or bought with the berries nor need the buds be injured by pulling the long stems away from them by hand, as is often done, to the great damage of next year's crop.

The straps or keepers 14 and 16 may be made of leather or any other suitable material. The cutting edges of the jaws come together in a shearing manner to make them cut easier; but it is also possible to operate them without such shearing shape. This is one of many modifications which may easily be made without diverging from the scope and spirit of this invention.

Having thus described my invention, what I claim, and desire to secure by Letters Patent, is—

1. A device of the class described, comprising a receptacle, a pair of upwardly-extending arms, secured with their lower ends to the upper end of the receptacle and having at their upper ends coacting clipping edges or jaws; said arms being provided respectively with keepers for the thumb and the fingers of the hand holding the receptacle, and one of the arms being pivoted at its lower end so as to swing with the upper end to and from the other arm, and a spring engaging said pivoted arm to hold it normally away from the other arm; said other arm being rigidly fixed to the receptacle so as to hold it in plumb position and to tip it in emptying it.

2. A device of the class described, comprising a receptacle and a pair of arms secured to the upper end thereof and projecting above the receptacle so as to be grasped and closed by the hand, said arms being pivotally connected at the lower ends and having the upper ends provided with horizontally-disposed coacting cutting-jaws, a spring connected with the arms to spread them, straps or keepers upon the arms for the fingers and the thumb of the hand, a guide projecting from one of the arms and sliding upon the other arm, and means for stopping the closing of the arms and jaws at a certain point, substantially as and for the purposes set forth.

In testimony whereof I affix my signature in presence of two witnesses.

ELWOOD TATUM.

Witnesses:
L. J. LEECH,
S. H. MOTT.